US010260700B2

(12) United States Patent
Shimizu et al.

(10) Patent No.: US 10,260,700 B2
(45) Date of Patent: Apr. 16, 2019

(54) VEHICLE-MOUNTED LIGHT SOURCE DEVICE

(71) Applicant: USHIO DENKI KABUSHIKI KAISHA, Tokyo (JP)

(72) Inventors: Mikio Shimizu, Himeji (JP); Takumi Sato, Himeji (JP)

(73) Assignee: USHIO DENKI KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/325,804

(22) PCT Filed: Jun. 29, 2015

(86) PCT No.: PCT/JP2015/068621
§ 371 (c)(1),
(2) Date: Jan. 12, 2017

(87) PCT Pub. No.: WO2016/009816
PCT Pub. Date: Jan. 21, 2016

(65) Prior Publication Data
US 2017/0175967 A1  Jun. 22, 2017

(30) Foreign Application Priority Data

Jul. 14, 2014  (JP) ................. 2014-144184

(51) Int. Cl.
G02B 5/02 (2006.01)
G02B 5/32 (2006.01)
(Continued)

(52) U.S. Cl.
CPC .............. *F21S 41/43* (2018.01); *F21S 41/00* (2018.01); *F21S 41/125* (2018.01); *F21S 41/14* (2018.01);
(Continued)

(58) Field of Classification Search
CPC .... F21S 48/1154; F21S 48/145; F21S 48/125; G02B 5/32
See application file for complete search history.

(56) References Cited

U.S. PATENT DOCUMENTS 5,117,335 A      5/1992  Yamada
2006/0039160 A1* 2/2006  Cassarly .............. A47F 11/10
                                                    362/551
(Continued)

FOREIGN PATENT DOCUMENTS

EP    2317217 A2    5/2011
JP    H03-201301 A  9/1991
(Continued)

OTHER PUBLICATIONS

Notification of Transmittal of Translation of the International Preliminary Report on Patentability and Translation of Written Opinion of the International Searching Authority; PCT/JP2015/068621 dated Jan. 26, 2017.
(Continued)

*Primary Examiner* — Alexander K Garlen
(74) *Attorney, Agent, or Firm* — Studebaker & Brackett PC

(57) ABSTRACT

The vehicle-mounted light source device of the present invention includes a light source unit including a light source that emits a red laser beam, a light source that emits a green laser beam, and a light source that emits a blue laser beam; a light combining system that combines the red laser beam, the green laser beam, and the blue laser beam; a light diffusing element that adjusts diffusion angles of light beams emitted from the light combining system to a predetermined angle; an optical projection system that projects light beams emitted from the light diffusing element to distance; and a light distribution controller that is disposed between the light
(Continued)

diffusing element and the optical projection system and that controls distributions of light beams introduced into the optical projection system.

10 Claims, 11 Drawing Sheets

(51) Int. Cl.
| | |
|---|---|
| *F21S 41/00* | (2018.01) |
| *F21S 41/14* | (2018.01) |
| *F21S 41/16* | (2018.01) |
| *F21S 41/20* | (2018.01) |
| *F21S 41/24* | (2018.01) |
| *F21S 41/32* | (2018.01) |
| *F21S 41/33* | (2018.01) |
| *F21S 41/43* | (2018.01) |
| *F21S 43/00* | (2018.01) |
| *G02B 27/09* | (2006.01) |
| *G02B 27/10* | (2006.01) |
| *F21S 41/125* | (2018.01) |
| *F21S 41/255* | (2018.01) |
| *F21Y 113/13* | (2016.01) |
| *F21Y 115/30* | (2016.01) |

(52) U.S. Cl.
CPC ............... *F21S 41/16* (2018.01); *F21S 41/24* (2018.01); *F21S 41/255* (2018.01); *F21S 41/285* (2018.01); *F21S 41/32* (2018.01); *F21S 41/321* (2018.01); *F21S 41/336* (2018.01); *F21S 43/00* (2018.01); *G02B 5/32* (2013.01); *F21Y 2113/13* (2016.08); *F21Y 2115/30* (2016.08); *G02B 5/0252* (2013.01); *G02B 27/0994* (2013.01); *G02B 27/1006* (2013.01)

(56) References Cited

U.S. PATENT DOCUMENTS

| | | | | |
|---|---|---|---|---|
| 2008/0239741 A1* | 10/2008 | Nakada | ................ | F21S 48/1159 362/507 |
| 2008/0285297 A1* | 11/2008 | Ishida | ................. | F21S 48/1154 362/539 |
| 2011/0157865 A1* | 6/2011 | Takahashi | .............. | F21S 48/115 362/84 |
| 2011/0279007 A1* | 11/2011 | Kishimoto | ........... | B60Q 1/0011 313/45 |
| 2011/0280033 A1* | 11/2011 | Kishimoto | ........... | F21S 48/1145 362/543 |
| 2011/0280039 A1* | 11/2011 | Kishimoto | ........... | B60Q 1/0011 362/554 |
| 2012/0106184 A1* | 5/2012 | Kishimoto | ........... | B60Q 1/0011 362/510 |
| 2012/0106186 A1* | 5/2012 | Kishimoto | ......... | C09K 11/0883 362/510 |
| 2013/0027962 A1* | 1/2013 | Takahashi | ............ | F21S 48/1145 362/538 |
| 2013/0250381 A1* | 9/2013 | Toko | ........................ | G02B 5/32 359/19 |
| 2013/0335989 A1* | 12/2013 | Sato | .......................... | F21V 9/16 362/510 |
| 2014/0003074 A1 | 1/2014 | Kishimoto | | |
| 2014/0168940 A1* | 6/2014 | Shiomi | ................ | B60Q 1/0023 362/84 |
| 2014/0254188 A1 | 9/2014 | Masuda et al. | | |
| 2014/0321143 A1* | 10/2014 | Hossfeld | ............... | F21S 48/137 362/516 |
| 2014/0347843 A1* | 11/2014 | Kishimoto | ............. | F21S 48/115 362/84 |
| 2014/0347874 A1 | 11/2014 | Nakaya | | |

FOREIGN PATENT DOCUMENTS

| | | |
|---|---|---|
| JP | 2009-021237 A | 1/2009 |
| JP | 2011-090839 A | 5/2011 |
| JP | 2012-169375 A | 9/2012 |
| JP | 2012-204072 A | 10/2012 |
| JP | 2013-125693 A | 6/2013 |
| JP | 2013-131334 A | 7/2013 |

OTHER PUBLICATIONS

International Search Report issued in PCT/JP2015/068621; dated Aug. 25, 2015.

An Office Action, "Notification of Reasons for Refusal", issued by the Japanese Patent Office dated Nov. 17, 2017, which corresponds to Japanese Patent Application No. 2014-144184 and is related to U.S. Appl. No. 15/325,804; with English translation.

* cited by examiner

Fig. 5
(a)
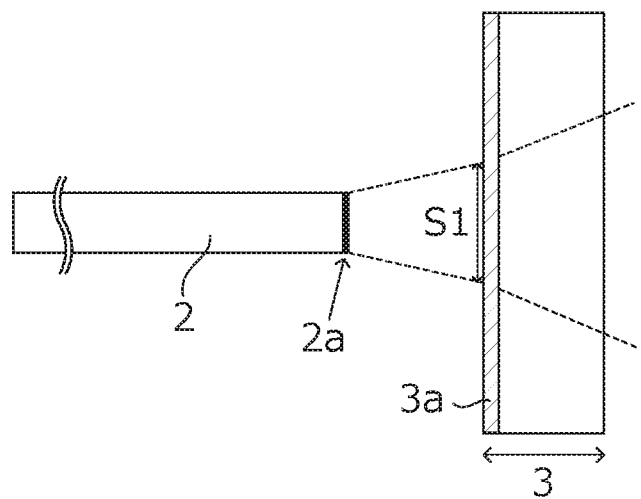
(b)
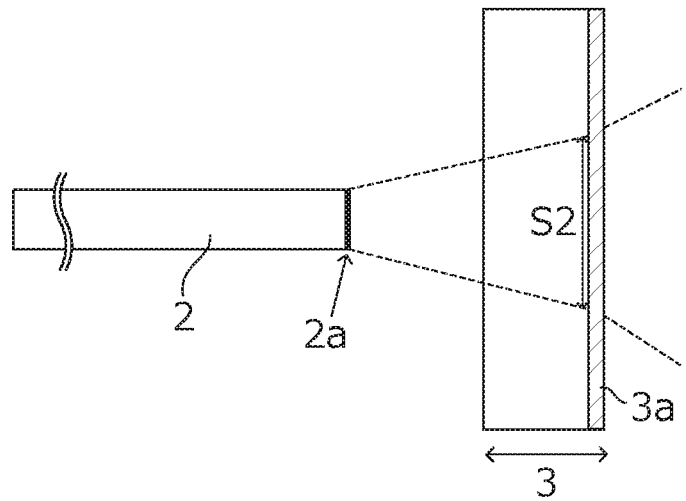

Fig. 7
(a) 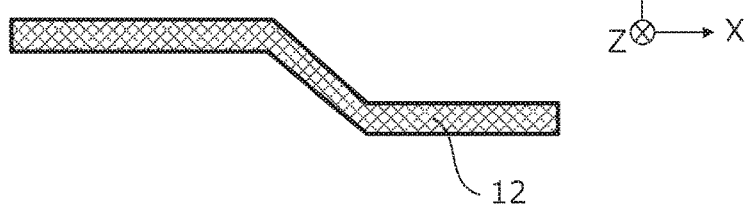
(b) 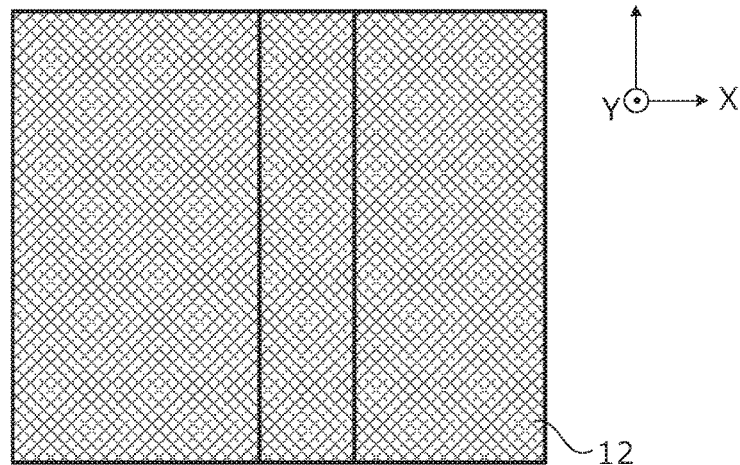

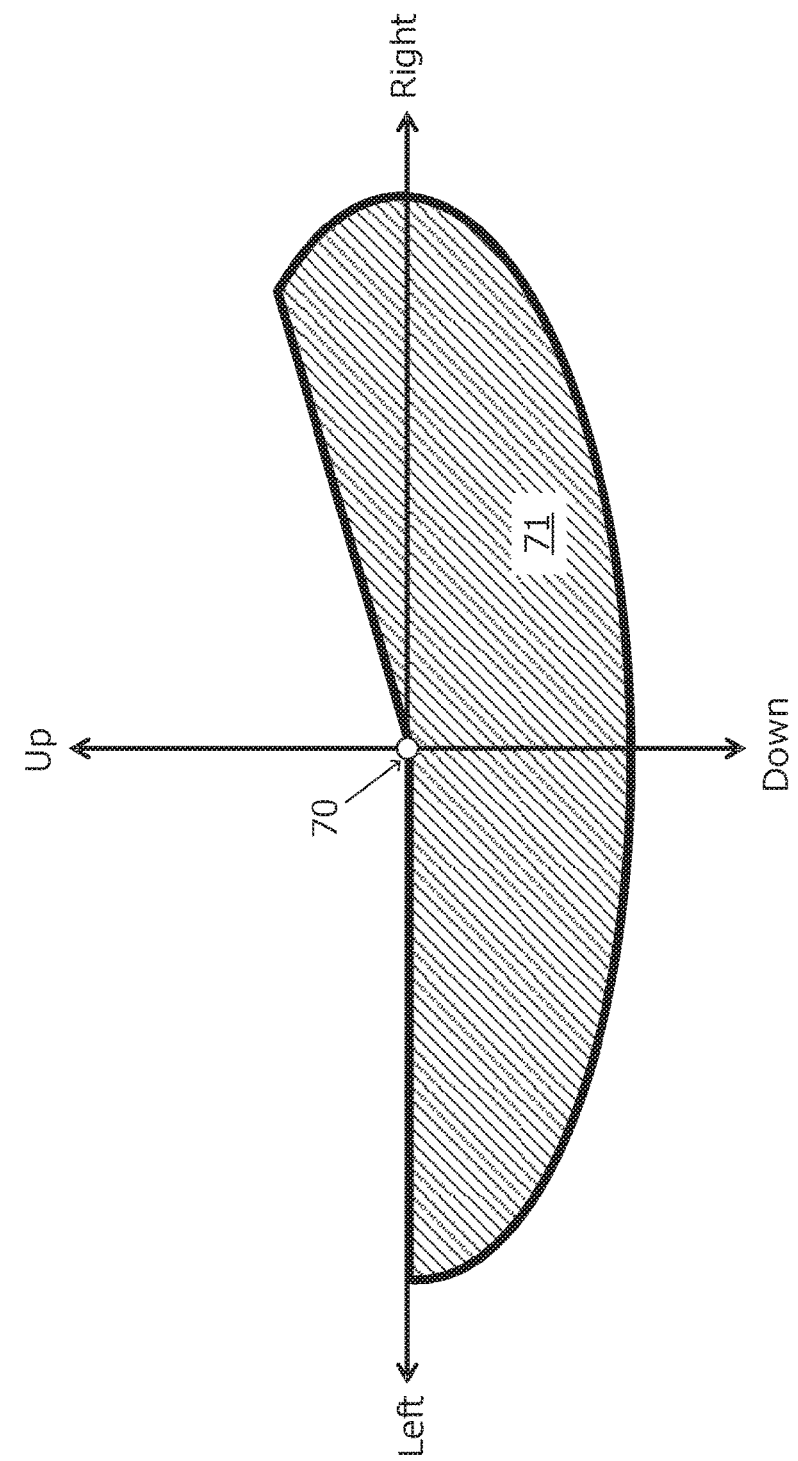

VEHICLE-MOUNTED LIGHT SOURCE DEVICE

TECHNICAL FIELD

The present invention relates to a vehicle-mounted light source device, and more particularly to a vehicle-mounted light source device having a light source unit that emits laser beams of various colors.

BACKGROUND ART

Techniques of utilizing a laser beam emitted from a laser element for a vehicle-mounted light source device, in particular, a headlamp, have hitherto been known (see Patent Documents 1 to 3 listed below).

Patent Documents 1 and 2 both disclose a technique of using a laser beam as a phosphor exciting light. That is, in these techniques, a phosphor is irradiated with and excited by a laser beam emitted from a laser element to utilize the obtained fluorescent light as headlight.

Patent Document 3, on the other hand, discloses a technique of producing a white laser by combining colored laser beams emitted from laser elements that each emit red, green, and blue laser beams, to utilize this white laser as headlight.

PRIOR ART DOCUMENT

Non-Patent Document

Patent Documents

Patent Document 1: JP-A-2012-204072
Patent Document 2: JP-A-2013-131334
Patent Document 3: JP-A-2013-125693

SUMMARY OF THE INVENTION

Problems to be Solved by the Invention

When the light source device is used in vehicle-mounted applications, the distribution of the light emitted from the device is specified by a certain standard. FIG. 10 is a drawing that schematically shows an example of a light distribution standard; it is a drawing corresponding to an ECE (Economic Commission for Europe) standard of asymmetric passing beam (R112). FIG. 10 corresponds to a projection surface disposed at a position a predetermined distance from the light source device. The region denoted as ZONE III in FIG. 10 is a region where irradiation (projection) of light is prohibited. This is determined for safety reasons, for example, in consideration of glare to oncoming drivers.

FIG. 11 is a drawing that depicts the drawing of this FIG. 10 in a simplified and more schematic form. Region 71 in FIG. 11 is a region that should be irradiated with light, while light irradiation is prohibited outside this region. The center point 70 in FIG. 11 corresponds to the position of the optical axis of an optical projection system when light is projected from the light source device. The region 71 is asymmetric in left-to-right direction, more specifically, it extends upward from the center point 70 on the right side, because the light distribution pattern of FIG. 11 is assumed to be that of the light emitted from a light source device to be mounted on a vehicle with the driver's seat on the left side.

In Patent Documents 1 and 2, a laser beam is used mainly as an exciting light, and fluorescent light is used as actual illumination light. Therefore, illumination light that meets a predetermined light distribution pattern can be realized by designing the shape of a component filled with a phosphorus material, for example, such as to conform to a shape in accordance with the light distribution standard mentioned above.

On the other hand, when the laser beam itself is used as illumination light as in Patent Document 3, the illumination light that meets the light distribution standard cannot be realized with a raw laser beam, since it has a high level of straightness. Therefore, in Patent Document 3, the traveling direction of light is controlled with the use of a rotatable reflecting mirror to realize illumination light that meets a predetermined light distribution pattern.

When laser elements of various colors are to be used, it is extremely difficult to make the sizes, numbers of emitters, and layout patterns of laser elements for respective colors to be the same with each other, because laser elements are made of different materials and have different light outputs in accordance with the wavelengths. That is, when a laser element that emits a red laser light, a laser element that emits a green laser light, and a laser element that emits a blue laser light are separately acquired to be utilized as the light source of a vehicle-mounted light source device, the size and output of the elements differ for each color, so that, in order to achieve a desired white light, typically, different numbers of elements or emitters, and different layout patterns of emitters have to be prepared for each color.

As a result, when a white light is generated by combining colored laser beams formed by different elements, the angle of light beams incident on the light combining system, i.e., the angular distribution, differs for each color. This will cause a problem that a blue component of light emitted from the light combining system may appear intensely at a certain angle, while a red component of light may appear intensely at another angle, and as a result the light obtained as illumination light will have color non-uniformity.

In view of the problems described above, an object of the present invention is to realize a vehicle-mounted light source device capable of producing a white light with reduced color non-uniformity, in applications where a white light produced by combining colored laser beams is used as illumination light.

Means for Solving the Problem

A vehicle-mounted light source device of the present invention has:

a light source unit including a light source that emits a red laser beam, a light source that emits a green laser beam, and a light source that emits a blue laser beam;

an light combining system that combines the red laser beam, the green laser beam, and the blue laser beam;

a light diffusing element that adjusts diffusion angles of light beams emitted from the light combining system to a predetermined angle;

an optical projection system that projects light beams emitted from the light diffusing element to distance; and a light distribution controller that is disposed between the light diffusing element and the optical projection system and that controls distributions of light beams introduced into the optical projection system.

With the configuration described above, the diffusion angles of the colored laser beams combined in the light combining system are adjusted to a predetermined angle by the light diffusing element so that the angular distribution of each color is made uniform or substantially uniform. Therefore, with the optical projection system that projects this light emitted from the light diffusing element, the object can be irradiated with a white light without color non-uniformity, or with reduced color non-uniformity.

For the light combining system, optical fibers can be used.

For the light diffusing element, a holographic diffuser plate including a light diffusing surface that has surface irregularities can be used. In this case, the holographic diffuser plate is preferably formed with the light diffusing surface at least on one side that is closer to an emission end of the light combining system.

If the light diffusing surface of the holographic diffuser plate is not on the side closer to the emission end of the light combining system but on the opposite side, the light emitted from the emission end of the light combining system and introduced into the holographic diffuser plate propagates through the holographic diffuser plate before reaching the light diffusing surface. Being a laser beam, the light emitted from the emission end of the light combining system has a high degree of straightness, but nevertheless it propagates with a certain divergent angle. Thus the light spreads as it propagates through the holographic diffuser plate before entering the light diffusing surface. As a result, the area of the region where the light enters in the light diffusing surface is larger as compared to when the light diffusing surface is formed on the holographic diffuser plate on the side closer to the emission end of the light combining system. Consequently, in order to guide the light that passed through the light diffusing surface to an irradiated surface highly efficiently with the use of a downstream optical projection system, the downstream optical projection system will have to be made larger.

On the other hand, when the light diffusing surface of the holographic diffuser plate is formed on the side closer to the emission end of the light combining system, the region irradiated with the laser beam on the light diffusing surface can be made smaller. There is no difference in the divergent angle of light passing through this light diffusing surface between the design with the light diffusing surface disposed on the side closer to the emission end of the light combining system and the design with the light diffusing surface disposed on the side farther from the emission end of the light combining system. Therefore, the size of the region of incident light on the light diffusing surface has bearing on the size of the downstream optical projection system. Accordingly, with the configuration described above, the optical projection system located downstream of the holographic diffuser plate can be made smaller.

The light distribution controller may be configured to have a mask member that blocks incident light. This mask member can be configured to absorb light itself when irradiated, so that no light is passed through to a downstream system. For example, the mask member can be made of a metal material (such as an aluminum die cast alloy), or a resin material (such as a colored polycarbonate resin).

The mask member preferably has a shape in accordance with a light distribution standard for a vehicle-mounted lighting system. Namely, by blocking part of the light emitted from the light diffusing element with the mask member, the light is prevented from being projected to a region where light projection is prohibited by the light distribution standard (hereinafter referred to as "prohibited region" where applicable).

The light distribution controller can be configured to include a reflecting mirror disposed between the mask member and the light diffusing element. Here, the reflecting mirror is preferably disposed such that at least part of a reflecting surface of the reflecting mirror is parallel to the optical axis of the optical projection system. The concept "parallel" as used herein is not limited to completely parallel lines but also includes substantially parallel lines.

As mentioned above, the mask member serves the function of blocking part of the light emitted from the light diffusing element so that the light is not directed to the prohibited region. More specifically, the mask member has its surface (masking surface) disposed non-parallel to the optical path of the light emitted from the light diffusing element, and more preferably disposed orthogonally to the optical axis of the optical projection system. This way, the light emitted from the light diffusing element and guided to the masking surface is absorbed by the mask member and will not be utilized as the light projected from the optical projection system.

In contrast, as in the configuration described above, by disposing the reflecting mirror between the mask member and the light diffusing element such that its reflecting surface is parallel to the optical axis of the optical projection system, at least part of light, which would be directed to the prohibited region if the reflecting mirror and mask member were not there, can be introduced to the reflecting surface of the reflecting mirror before entering the surface of the mask member. This light is reflected to a direction away from the mask member and guided toward the optical projection system. Since this light is not directed toward the prohibited region, it can be utilized as illumination light to a object via the optical projection system. Namely, the light utilization efficiency can be improved.

In the configuration described above, it is preferable to dispose an emission end face of the light combining system and a reflecting surface of the reflecting mirror on both sides of an optical axis of the optical projection system. This way, the effect of improving the light utilization efficiency can be further enhanced.

In the configuration described above, the mask member may be disposed at a focal point of the optical projection system. This way, an illuminance distribution formed by the light distribution controller that includes the mask member can be formed at (infinite) distance from the optical projection system, and thus illumination light with a desired light distribution pattern can be achieved.

In the configuration described above, the light combining system may have an emission end disposed closer to the optical projection system than a focal point of the optical projection system. This way, the distance between the emission end of the light combining system and the optical projection system can be made shorter, so that the length of the entire optical system along the optical axis direction of the optical projection system can be made shorter, which in turn helps reduce the size of the device.

Effect of the Invention

According to the vehicle-mounted lighting device of the present invention, in applications where a white light produced by combining colored laser beams is used as illumination light, a white light with reduced color non-uniformity can be used as the illumination light of headlamps.

BRIEF DESCRIPTION OF THE DRAWINGS

FIG. 5 is a drawing that schematically shows one example of a positional relationship between a light diffusing surface of the light diffusing element and the emission end of the light combining system.

FIG. 7 is a drawing that schematically shows a configuration of a reflecting mirror viewed from a Z-axis direction and a Y-axis direction.

FIG. 11 is a drawing that shows the light distribution standard of FIG. 10 in a more simplified and schematic form.

MODE FOR CARRYING OUT THE INVENTION

Embodiments of the vehicle-mounted light source device of the present invention will be described with reference to the drawings. It should be noted that the dimensional ratios in various drawings do not necessarily coincide with the actual dimensional ratios.

[First Embodiment]

Figure 1:
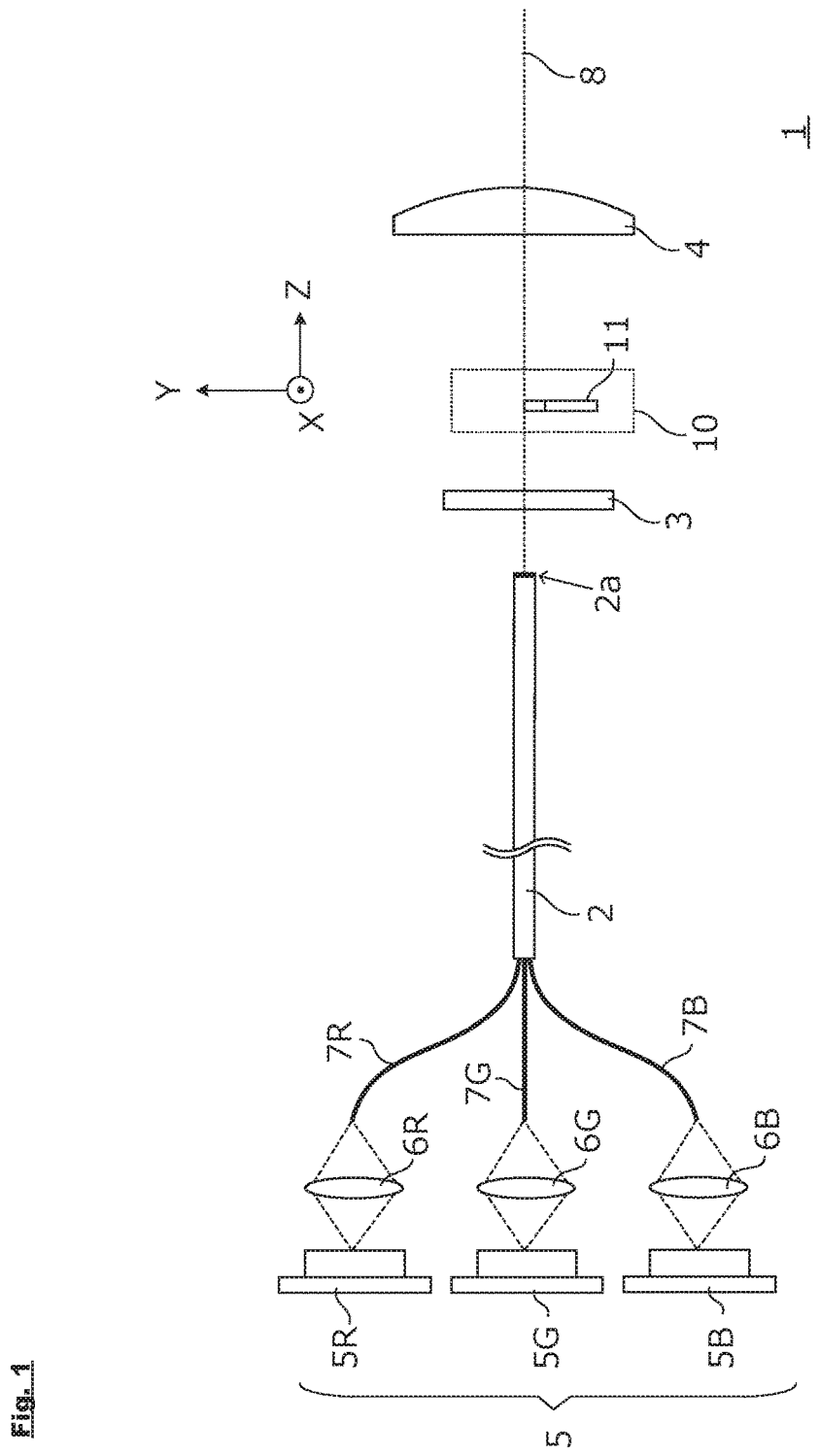
FIG. 1 is a drawing that schematically shows a configuration of an optical system in a first embodiment of a vehicle-mounted light source device.

FIG. 1 is a drawing that schematically shows a configuration of an optical system in a first embodiment of the vehicle-mounted light source device. A vehicle-mounted light source device 1 includes an optical projection system 4 for projecting light forward as the light (illumination light) of a headlamp. The optical projection system 4 may be configured with the use of a plano-convex lens or a cylindrical lens, and may be realized by combining a plurality of lenses.

In FIG. 1, a direction parallel to the optical axis 8 of the optical projection system 4 will be referred to as Z-axis, and the two axes perpendicular to the Z-axis will be referred to as X-axis and Y-axis. X-Z plane is a horizontal plane, while Y-axis is an axis parallel to a vertical direction. Namely, the Z-axis represents the illumination direction and corresponds to a forward direction when the vehicle-mounted light source device 1 is mounted on a vehicle, the Y-axis direction corresponds to the up-and-down direction of the vehicle, and the X-axis direction corresponds to the left-to-right direction of the vehicle.

The vehicle-mounted light source device 1 includes a light source unit 5 having a light source 5R that emits a red laser beam, a light source 5G that emits a green laser beam, and a light source 5B that emits a blue laser beam. The light sources 5R, 5G, and 5B are each formed by a semiconductor laser element, for example, and respective elements may have different numbers of emitters in different layout patterns. The element sizes of the respective light sources 5R, 5G, and 5B may also be different from each other.

The vehicle-mounted light source device 1 includes light collection systems (6R, 6G, 6B) and light guide systems (7R, 7G, 7B) for each of the colors. A red laser beam emitted from the light source 5R is collected by the light collection system 6R and introduced into the light guide system 7R. A green laser beam emitted from the light source 5G is collected by the light collection system 6G and introduced into the light guide system 7G. A blue laser beam emitted from the light source 5B is collected by the light collection system 6B and introduced into the light guide system 7B. The light collection systems (6R, 6G, 6B) are formed of plano-convex lenses or double-convex lenses, for example, while the light guide systems (7R, 7G, 7B) are formed of optical fiber, for example. The light collection systems (6R, 6G, 6B) may be formed by a plurality of lenses.

The vehicle-mounted light source device 1 includes a light combining system 2 that combines R, G, and B light beams transmitted through the light guide systems (7R, 7G, 7B) to produce a white light. The light combining system 2 is formed of optical fibers, for example, but can also be configured with a fly's eye lens, rod integrator, dichroic mirror, or the like.

As described above, the respective light sources 5R, 5G, and 5B may have different numbers of emitters and different layout patterns. In this case, the divergent angles of light beams when they enter the light collection systems (6R, 6G, 6B) differ from one color to another, or the intensities differ for each angle. Accordingly, the angular distributions when the light beams are introduced into the light combining system 2 differ for each color, and therefore the angular distributions of light differ for each color at the emission end 2a of the light combining system 2.

The vehicle-mounted light source device 1 includes a light diffusing element 3 that adjusts the diffusion angle of the light emitted from the emission end 2a of the light combining system 2 to a predetermined angle. The light diffusing element 3 is configured with a holographic diffuser plate, for example. A holographic diffuser plate has a light diffusing surface with surface irregularities so that the light diffusion angle can be set to a predetermined angle (of, e.g., 10° or the like) as determined by the irregularities pattern. As the light emitted from the emission end 2a of the light combining system 2 is directed to a preset diffusion angle when introduced into the light diffusing element 3, the angular distributions that differed for each color are made uniform, or substantially uniform.

Figure 2:
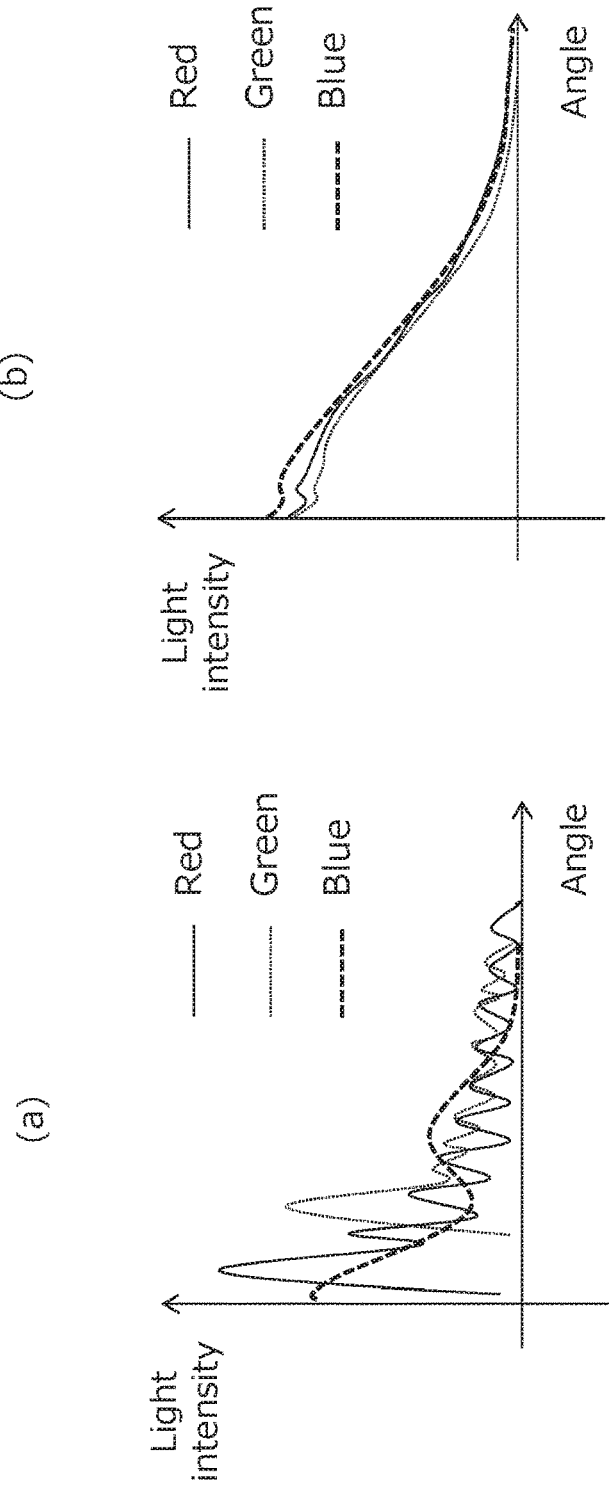
FIG. 2 is a graph showing, in comparison, angular distributions of light beams for each color immediately after being emitted from an emission end of a light combining system, and angular distributions of light beams for each color immediately after being emitted from a light diffusing element.

FIG. 2 is a graph showing angular distributions of respective colors, (a) showing the angular distributions of light immediately after being emitted from the emission end 2a of the light combining system 2, and (b) showing the angular distributions of light immediately after being emitted from the light diffusing element 3. FIG. 2 indicates that, while light beams differed largely in angular distribution for each color immediately after being emitted from the emission end 2a of the light combining system 2, there are no large differences in the angular distribution after the light beams have passed through the light diffusing element 3.

Figure 3:
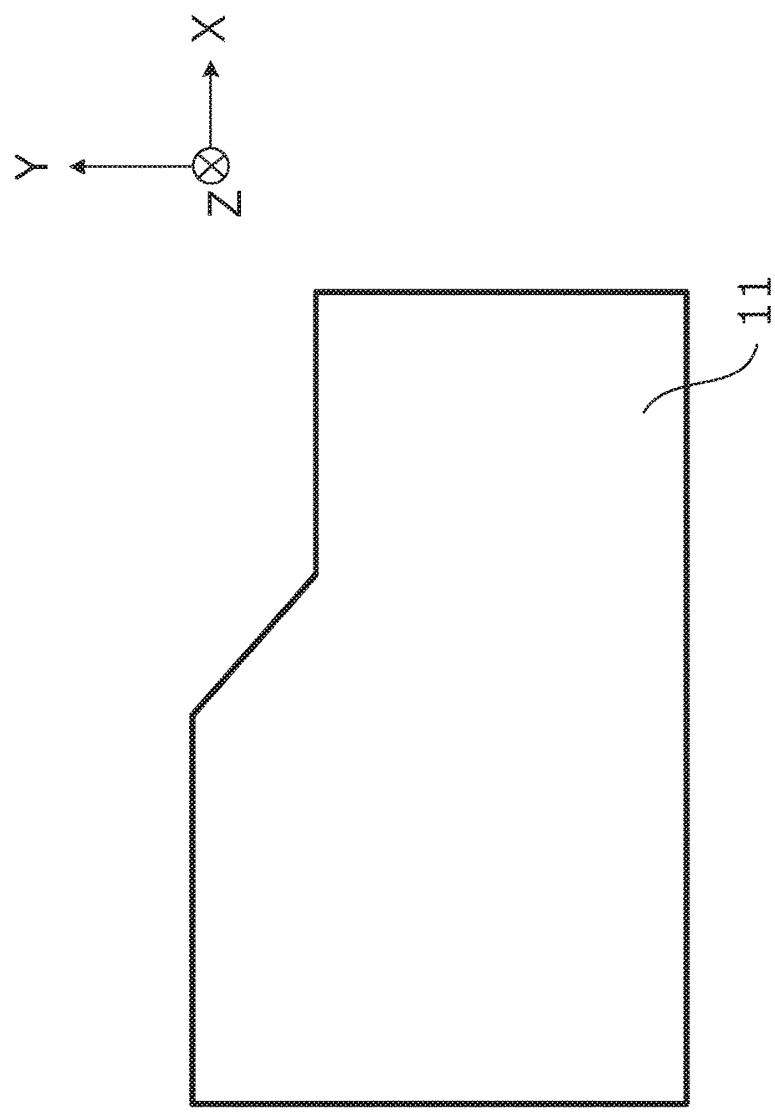
FIG. 3 is a drawing that schematically shows a configuration of a mask member when viewed in a Z-axis direction.

The vehicle-mounted light source device 1 includes a light distribution controller 10 for forming a light distribution pattern of light when projected as the illumination light of a headlamp. In this embodiment, a mask member 11 is provided as the light distribution controller 10. FIG. 1 schematically shows the configuration of the mask member 11 as viewed from the X-axis direction. FIG. 3 schematically shows the configuration of the mask member 11 as viewed from the Z-axis direction.

The mask member 11 absorbs the laser light emitted from the emission end 2a of the light combining system 2 (and, more specifically, further passed through the light diffusing element 3) into the surface of the mask member 11 and does not allow the laser beam to progress further forward. Accordingly, the mask member 11 should preferably be made of a material that absorbs laser light, and can be made of, for example, a metal material such as an aluminum die cast alloy, or a resin material such as a colored polycarbonate resin. The mask member 11 may also be formed of a filter having different transmittances in different parts. In this case, the filter itself may be rectangular in the Z-axis direction, and only its masking region, i.e., the region having an extremely low transmittance, may have the shape shown in FIG. 3.

The mask member 11 shown in FIG. 3 is configured asymmetric in left-to-right direction. This results from the light distribution pattern required of the light of a car headlamp being asymmetric in left-to-right direction, as explained with reference to FIG. 10 and FIG. 11. Namely, the mask member 11 can have a shape determined based on a shape as required by a light distribution standard of a car, for example.

In FIG. 1, the mask member 11 is disposed lower than the optical axis 8 of the optical projection system 4. This design assumes the necessity of complying with a light distribution standard that prohibits light irradiation above the center point as explained with reference to FIG. 10 and FIG. 11. That is, the light that travels upward after being emitted from the light diffusing element 3 is introduced into the optical projection system 4 without being blocked by the mask member 11. The light is then refracted downward in the optical projection system 4. The terms "above" or "upward" as regards the light traveling direction used herein mean that the light progresses in the positive direction both along the Z-axis and the Y-axis, while the terms "below" or "downward" mean that the light progresses in the positive direction along the Z-axis but in the negative direction along the Y-axis.

Assuming that the mask member 11 is not present, the light that travels downward after being emitted from the light diffusing element 3 is also introduced into the optical projection system 4. This light is refracted in the optical projection system 4 and proceeds upward. While it is not desirable that light travel above the center point 70 (in the positive direction along the Y-axis) as has been described with reference to FIG. 11, such light could travel above the center point 70. Therefore, in order to eliminate this light, the mask member 11 is disposed at a position lower (negative direction along the Y-axis) than the optical axis 8 of the optical projection system 4.

Figure 4:
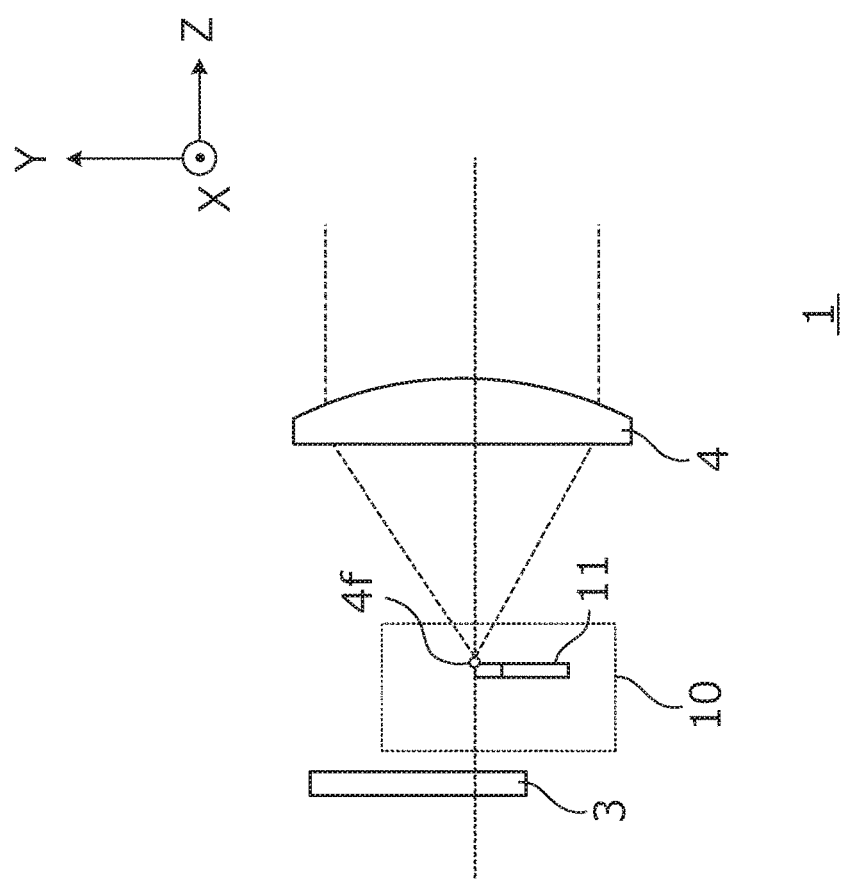
FIG. 4 is a drawing that schematically shows one example of a positional relationship between an optical projection system and a mask member.
Figure 10:
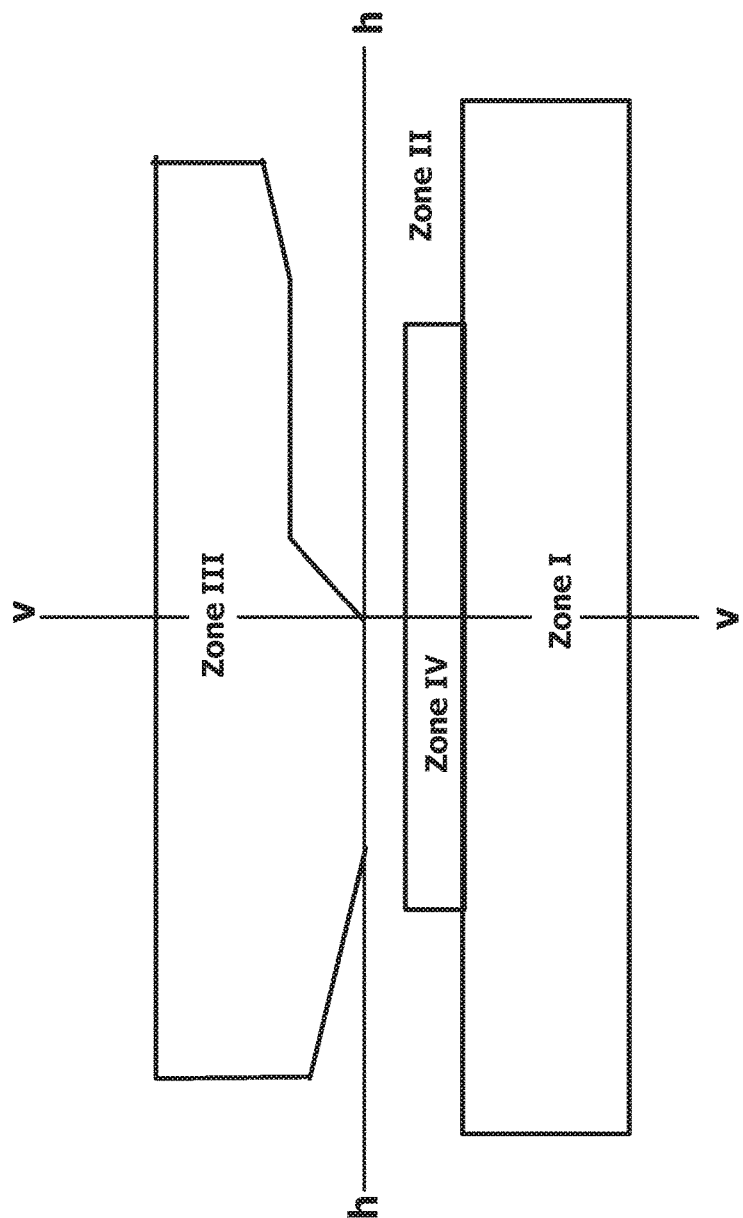
FIG. 10 is a drawing that shows one example of a light distribution standard.

The mask member 11 may be disposed at a position of a focal point 4f of the optical projection system 4 as shown in FIG. 4. With this configuration, an image at the position of the mask member 11 can be projected at infinite distance. The requirements of the light distribution pattern described with reference to FIG. 10 and FIG. 11 are based on an illuminance distribution at about 25 m forward of the light source device, and this corresponds to the illuminance distribution at infinite distance in geometric optics.

The optical projection system 4 projects light with an illuminance distribution formed by the light distribution controller 10 forward a predetermined distance (of, e.g., 25 m). In this embodiment, the light distribution controller 10 is formed by the mask member 11. By this mask member 11 is disposed at the position of the focal point 4f of the optical projection system 4, the light is projected by the optical projection system 4 to the position forward mentioned above, with the illuminance distribution formed at the position of the mask member 11. Namely, if an illuminance distribution required for satisfying the light distribution standard is realized at the position of the mask member 11, the light can be projected forward exactly with this illuminance distribution. The light distribution standard shown in FIG. 10, for example, requires that there should be a distinct brightness difference at the boundary between Zone III and Zone II. By disposing the mask member 11 at the position of the focal point 4f, the brightness difference will be clear at the position of the focal point 4f between the region shielded by the mask member 11 and the region not shielded by the mask member 11, and thus an illuminance distribution that can definitely satisfy the light distribution standard can be realized.

Accordingly, by designing the mask member 11 in a shape that is based on the requirements of the light distribution standard, and by disposing the mask member 11 at the position of the focal point of the optical projection system 4 as shown in FIG. 4, a light source device that will definitely satisfy the light distribution standard of a vehicle-mounted lighting system can be realized. This applies also to a second embodiment to be described later.

Further, as the light diffusing element 3, the light diffusing surface of the light diffusing element 3 is preferably disposed on the side closer to the emission end 2a of the light combining system 2. This applies also to the second and third embodiments to be described later. This will be explained with reference to the drawings.

FIG. 5 is a drawing schematically illustrating one example of the positional relationship between the light diffusing surface 3a of the light diffusing element 3 and the emission end 2a of the light combining system 2.

As shown in FIG. 5(b), when one side of the light diffusing element 3 farther from the emission end 2a of the light combining system 2 is the light diffusing surface 3a, the light emitted from the emission end 2a and introduced into the light diffusing element 3 propagates through the light diffusing element 3 before reaching the light diffusing surface 3a. In this case, as compared to when one side of the light diffusing element 3 closer to the emission end 2a of the light combining system 2 is the light diffusing surface 3a as shown in FIG. 5(a), the area of incident light in the light diffusing surface 3a is larger (S1<S2). This is because the laser beams emitted from the emission end 2a also propagate at a certain divergent angle.

Namely, the illumination area, i.e., the light emission area in the light diffusing surface 3a of the light diffusing element 3 can be made smaller in the configuration of FIG. 5(a) as compared to the configuration of FIG. 5(b). In view of the necessity to make use of the light that is not blocked by the mask member 11 as the illumination light as much as possible, a larger light emission area in the light diffusing surface 3a means that the optical projection system 4 needs to be larger. Therefore, the light diffusing surface 3a of the light diffusing element 3 is disposed on the side closer to the emission end 2a of the light combining system 2 as shown in FIG. 5(a), so as to reduce the size of the optical projection system 4, which in turn contributes to a reduction in overall size of the vehicle-mounted light source device 1. Optionally, the light diffusing element 3 may have the light diffusing surface 3a on both of the side closer to, and the side farther from, the emission end 2a of the light combining system 2.

A holographic diffuser plate was employed as the light diffusing element 3 in the example described above. This is because a holographic diffuser plate allows the light diffusion angle to be set to a predetermined angle through control of the surface pattern (hologram pattern) on the light diffusing surface. A common frosted glass plate, if employed, could serve the function of diffusing incident light. However, frosted glass cannot provide any control of diffusion angle, and the diffusion angle tends to be too large, which necessitates blocking of much light by means of the mask member 11 (light distribution controller 10) in order to realize the light satisfied the light distribution standard. This results in poor light utilization efficiency. From this viewpoint, it is preferable to use an element that allows setting of a diffusion angle as the light diffusion element 3, and a holographic diffuser plate is one preferable example of such an element.

[Second Embodiment]

Figure 6:
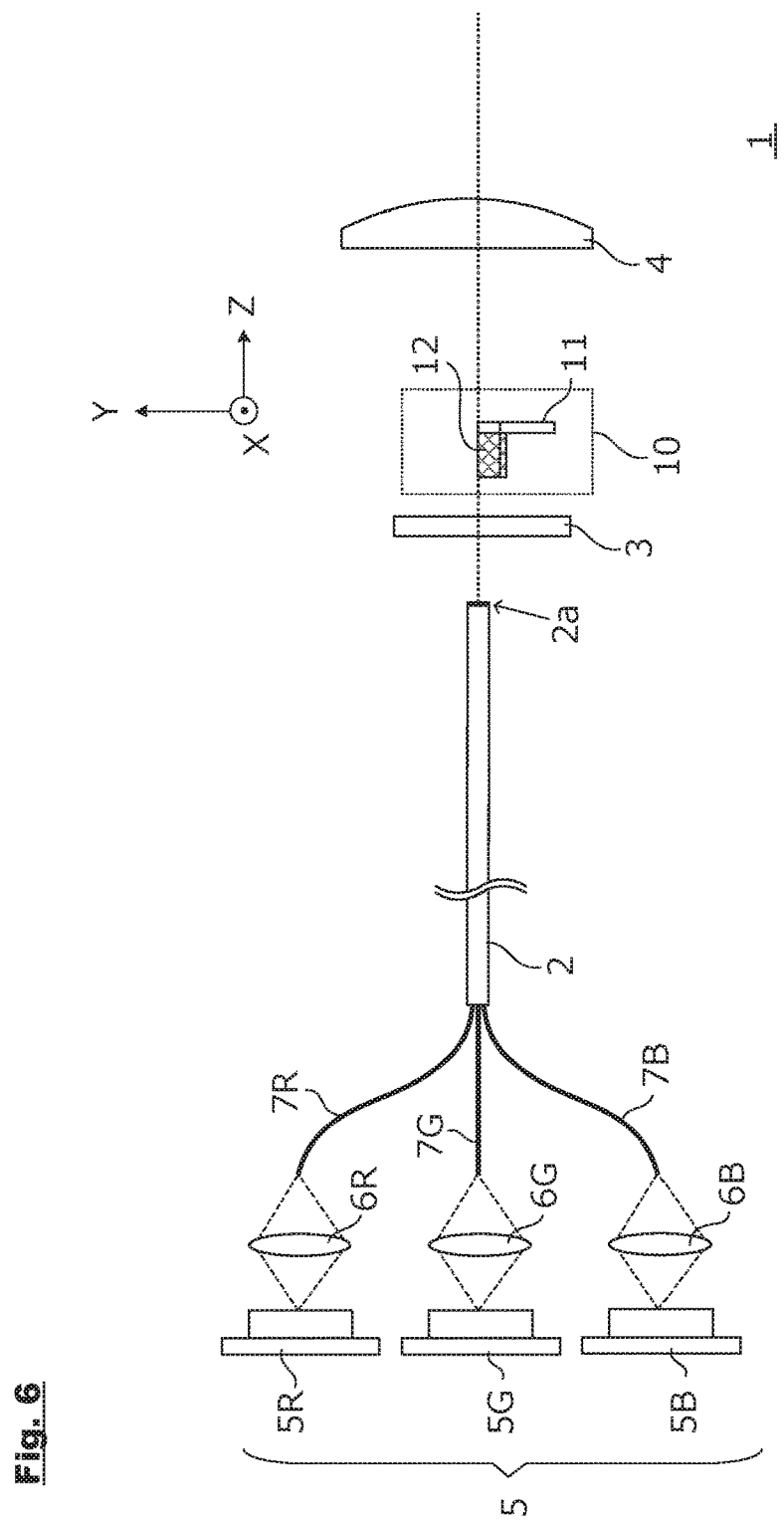
FIG. 6 is a drawing that schematically shows a configuration of an optical system in a second embodiment of the vehicle-mounted light source device.

FIG. 6 is a drawing that schematically shows a configuration of an optical system in a second embodiment of the vehicle-mounted light source device. In the following embodiment, only the differences from the first embodiment will be described.

A vehicle-mounted light source device 1 of the second embodiment includes a reflecting mirror 12 in addition to a mask member 11 as a light distribution controller 10. FIG. 6 schematically shows the configuration of the reflecting mirror 12 as viewed from the X-axis direction. FIG. 7 schematically shows the configuration of the reflecting mirror 12 as viewed from the Z-axis direction and Y-axis direction. In FIG. 7, (a) is a schematic diagram of the reflecting mirror 12 as viewed from the Z-axis direction, while (b) is a schematic diagram of the reflecting mirror 12 as viewed from the Y-axis direction.

The reflecting mirror 12 is configured to have a reflecting surface that contains a plane parallel to the X-Z plane so as to conform to the outer edge contour of the upper surface of the mask member 11. This is based on the assumption that the mask member 11 is made of a metal material. If the mask member 11 is formed by a filter having different transmittances in different parts as mentioned above, for example, the reflecting mirror 12 can be configured to have a reflecting surface that contains a plane parallel to the X-Z plane so as to conform to the shape of the region with a low transmittance.

The reflecting mirror 12 is disposed at a position closer to a light diffusing element 3 than the mask member 11.

As has been described in the first embodiment, the mask member 11 has the function of blocking part of the light emitted from the light diffusing element 3 and traveling downward, so that the light does not enter the optical projection system 4. In this configuration, however, the light that enters the mask member 11 is absorbed by the mask member 11 and will not be used as illumination light.

In this embodiment, of the downward light from the light diffusing element 3, at least some of light beams that would travel to a region where light irradiation is prohibited by the light distribution standard, if the mask member 11 and the reflecting mirror 12 were not present, are reflected by the reflecting mirror 12 prior to entering into the mask member 11. The light beams thus reflected by the reflecting mirror 12 thereby transform into light that travels upward toward the optical projection system 4. Since this light is refracted and directed downward by the optical projection system 4, it can be utilized as the light that illuminates a region where light irradiation is permitted by the light distribution standard. Namely, the light utilization efficiency is improved as compared to the first embodiment.

A light distribution standard commonly requires a predetermined illuminance to be satisfied in a region where light irradiation is permitted. According to the configuration of the first embodiment, at least part of the light emitted downward from the emission end 2a of the light combining system 2 cannot be utilized as illumination light. It is therefore necessary to increase the light output in a light source unit 5 in order to achieve the predetermined illuminance noted above.

In contrast, according to this embodiment, at least part of the light that is not utilized in the configuration of the first embodiment can be used as illumination light, so that the light output in the light source unit 5 can be made lower than that of the configuration of the first embodiment, which helps realize a power saving, energy saving vehicle-mounted lighting device.

In this embodiment, as mentioned with reference to FIG. 6 and FIG. 7 above, the reflecting mirror 12 was described as having a shape that conforms to the outer edge contour of the upper surface of the mask member 11. It should be noted that the reflecting mirror 12 is provided for the purpose of effectively utilizing the light, as illumination light, which would enter the mask member 11 were it not for the reflecting mirror 12, by reflecting the light and changing the traveling direction of the light before it enters the mask member 11. Therefore, the reflecting mirror 12 is not limited to the shape described above and may have any shape as long as it can change the traveling direction of the light by reflecting the light before the light enters the mask member 11 so that the light can be utilized as light irradiated from the optical projection system 4 toward a region 71 to be irradiated (see FIG. 11).

Figure 8:
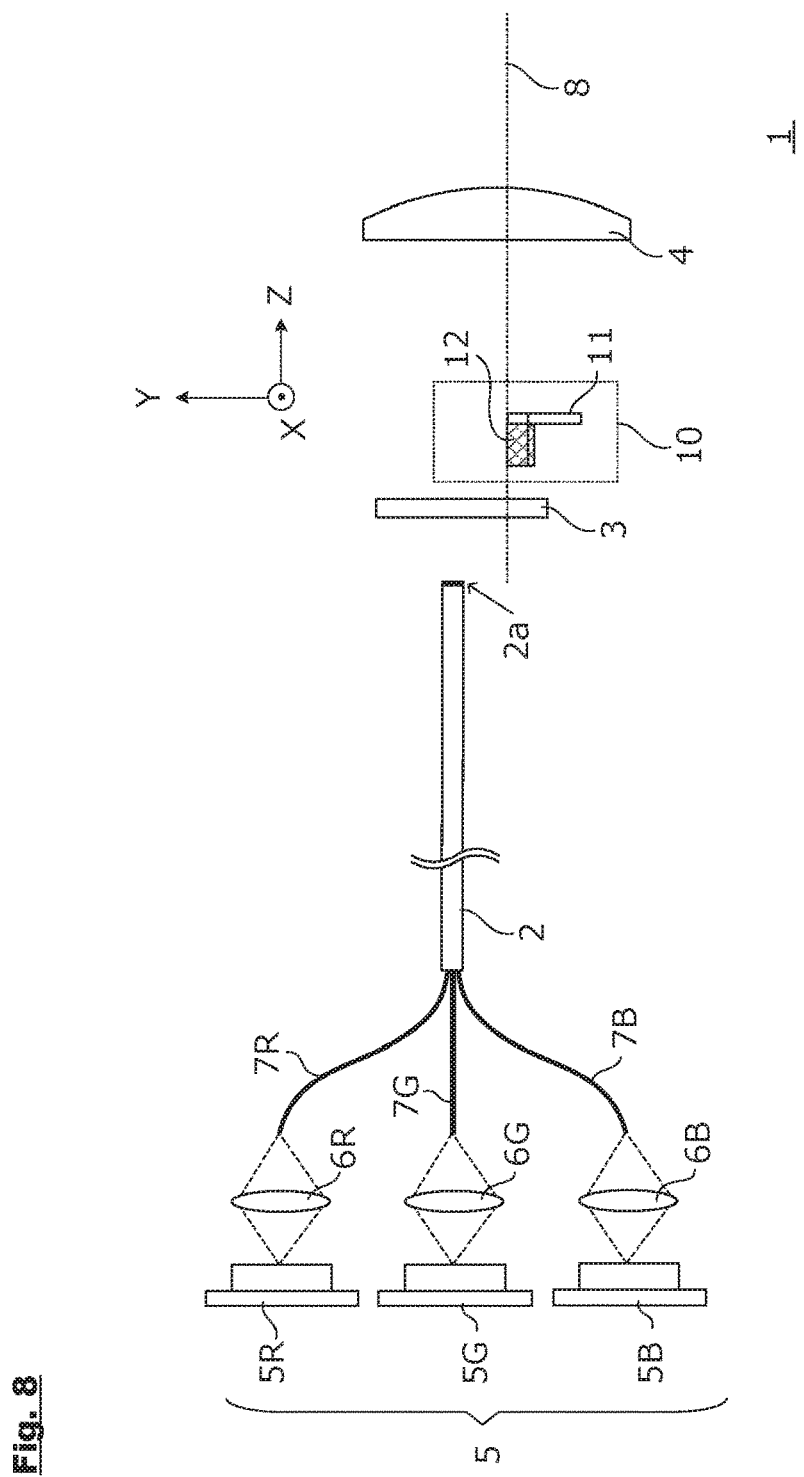
FIG. 8 is a drawing that schematically shows another configuration of the optical system in the second embodiment of the vehicle-mounted light source device.

In this embodiment, the reflecting mirror 12 may be disposed with a positional relationship as shown in FIG. 8. The emission end 2a of the light combining system 2 and the reflecting surface of the reflecting mirror 12 are on both sides of the optical axis 8 of the optical projection system 4. In the configuration of FIG. 8, the emission end 2a of the light combining system 2 is positioned above the optical axis 8 of the optical projection system, whereas the reflecting surface of the reflecting mirror 12 is positioned below the optical axis 8 of the optical projection system. With this configuration, the light emitted downward from the emission end 2a of the light combining system 2 can be reflected by the reflecting mirror 12 in a higher ratio, so that the light utilization efficiency can be further improved.

[Third Embodiment]

Figure 9:
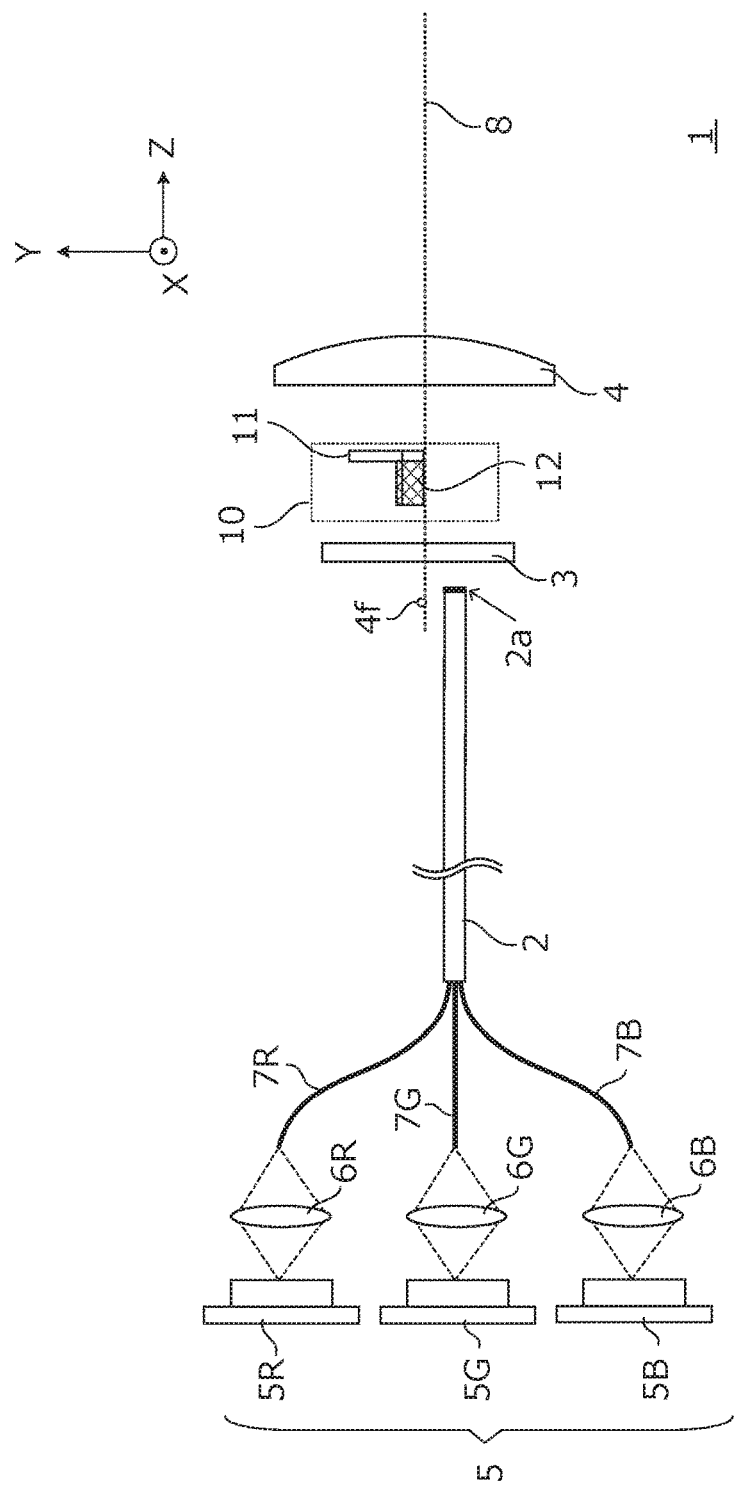
FIG. 9 is a drawing that schematically shows a configuration of an optical system in a third embodiment of the vehicle-mounted light source device.

FIG. 9 is a drawing that schematically shows a configuration of an optical system in a third embodiment of the vehicle-mounted light source device. In the following embodiment, only the differences from the first and second embodiments will be described.

This embodiment is different from the first embodiment and second embodiment in that the emission end 2a of the light combining system 2 is disposed at a position closer to the optical projection system 4 than the focal point 4f of the optical projection system 4. The light distribution controller 10 (here, the mask member 11 and the reflecting mirror 12) is disposed above the optical axis 8 of the optical projection system 4.

With this configuration, since the emission end 2a of the light combining system 2 is disposed at a position closer to the optical projection system 4 than the focal point 4f of the optical projection system 4, the light that was emitted downward from the emission end 2a, and passed through the light diffusing element 3, travels further downward even after it entered and was refracted in the optical projection system 4. Since this light illuminates a region where light irradiation is permitted by the light distribution standard, it does not need to be blocked or made to change course by the light distribution controller 10.

On the other hand, the light that was emitted upward from the emission end 2a of the light combining system 2 and passed through the light diffusing element 3 would travel further upward even after it entered and was refracted in the optical projection system 4 if the light distribution controller 10 were not there. This light could illuminate a region where light irradiation is prohibited by the light distribution standard. Therefore, the light distribution controller 10 is provided above the optical axis 8 of the optical projection system 4, so that such light is blocked or made to change its course downward.

With this configuration, the optical system can be arranged closer along the direction of the optical axis 8 of the optical projection system 4 (Z-axis direction) as compared to the configurations of the first embodiment and the second embodiment. Therefore, the vehicle-mounted light source device 1 can be made more compact. Note, however, when there is the mask member 11 provided as the light distribution controller 10, the optical projection system 4 may not be able to project an image at the point of the mask member 11 correctly. It may be necessary to increase the area of the region to be masked by the mask member 11 in order to prevent light from being projected to the prohibited region determined by the light distribution standard, as a result of which the light utilization efficiency could possibly be reduced as compared to the second embodiment.

While the configuration of this embodiment was illustrated and described as including the mask member 11 and the reflecting mirror 12 as the light distribution controller 10 as shown in FIG. 9, a configuration similar to the first embodiment without the reflecting mirror 12 is also possible.

DESCRIPTION OF REFERENCE SIGNS

1: vehicle-mounted light source device
2: light combining system
2a: emission end of the light combining system
3: light diffusing element
3a: light diffusing surface of the light diffusing element
4: optical projection system
4f: focal point of the optical projection system
5: light source unit
5B: blue light source
5G: green light source
5R: red light source
6B, 6G, 6R: light collection system(s)
7B, 7G, 7R: light guide system(s)
8: optical axis
10: light distribution controller
11: mask member
12: reflecting mirror
70: center point
71: region to be irradiated

The invention claimed is:

1. A vehicle-mounted light source device, comprising:
a light source unit including a light source that emits a red laser beam, a light source that emits a green laser beam, and a light source that emits a blue laser beam;
a light combining system that combines the red laser beam, the green laser beam, and the blue laser beam;
a light diffusing element that adjusts diffusion angles of light beams emitted from the light combining system to a predetermined angle;
an optical projection system that projects light beams emitted from the light diffusing element to distance;
a mask member that blocks incident light and is disposed at a position spaced apart from the light diffusing element between the light diffusing element and the optical projection system in an optical axis direction; and a reflecting mirror disposed between the mask member and the light diffusing element in the optical axis direction, wherein the reflecting mirror has a reflecting surface that conforms to at least a portion of an outer edge contour of the mask member in the optical axis direction, and part of the light emitted from the light diffusing element and projected to the mask member is not introduced into the optical projection system.

2. The vehicle-mounted light source device according to claim 1, wherein the light diffusing element is configured by a holographic diffuser plate including a light diffusing surface that has surface irregularities, and wherein
the holographic diffuser plate is formed with the light diffusing surface at least on one side that is closer to an emission end of the light combining system.

3. The vehicle-mounted light source device according to claim 1, wherein the mask member has a shape in accordance with a light distribution standard for a vehicle-mounted lighting system.

4. The vehicle-mounted light source device according to claim 1, wherein an emission end face of the light combining system and the reflecting surface of the reflecting mirror are disposed on both sides of an optical axis of the optical projection system.

5. The vehicle-mounted light source device according to claim 1, wherein the mask member is disposed at a focal point of the optical projection system.

6. The vehicle-mounted light source device according to claim 1, wherein the light combining system has an emission end disposed closer to the optical projection system than a focal point of the optical projection system.

7. The vehicle-mounted light source device according to claim 3, wherein the mask member is disposed at a focal point of the optical projection system.

8. The vehicle-mounted light source device according to claim 4, wherein the mask member is disposed at a focal point of the optical projection system.

9. The vehicle-mounted light source device according to claim 3, wherein the light combining system has an emission end disposed closer to the optical projection system than a focal point of the optical projection system.

10. The vehicle-mounted light source device according to claim 4, wherein the light combining system has an emission end disposed closer to the optical projection system than a focal point of the optical projection system.

* * * * *